United States Patent

Kleba et al.

[11] 4,249,088
[45] Feb. 3, 1981

[54] AUTOMATIC DEVICE FOR SYNCHRONIZATION OF PRIME MOVER WITH ELECTRICAL GRID

[75] Inventors: Ronald J. Kleba, Schenectady, N.Y.; Stanislaw H. Bednarski, Tripoli, Libya

[73] Assignee: General Electric Company, Schenectady, N.Y.

[21] Appl. No.: 58,901

[22] Filed: Jul. 19, 1979

[51] Int. Cl.³ ............................................. H02J 3/08
[52] U.S. Cl. ................................... 307/87; 307/127; 364/494
[58] Field of Search ................... 307/87, 127, 129; 290/40 R; 364/494

[56] References Cited

U.S. PATENT DOCUMENTS

| 3,562,545 | 2/1971 | Rubner | 307/87 |
|---|---|---|---|
| 3,801,796 | 4/1974 | Konrad | 307/87 |
| 3,887,820 | 6/1975 | Glennon | 307/87 |
| 3,892,978 | 7/1975 | Haley | 307/87 |

Primary Examiner—L. T. Hix
Assistant Examiner—James L. Dwyer
Attorney, Agent, or Firm—Jerome C. Squillaro

[57] ABSTRACT

A control circuit is disclosed for synchronizing a prime mover or electrical generator with an electrical grid or power line such that when the prime mover is connected to the grid;

(a) the instantaneous phase and slip are within allowable limits;

(b) the phase and slip expected at breaker closure, as contrasted to the instantaneous measured phase and slip, will be within given limits;

(c) the phase and slip anticipated at the breaker closure instant are optimal for the given trajectory, i.e. when they are the closest to their most desired values during the given transition. The circuit includes a clock for measuring the phase difference between the power line voltage and the generator voltage and means for calculating the rate of change of the phase difference which is a measure of difference of the respective frequencies known as the slip. The trends of phase and slip are then extrapolated by the amount of time it takes the breaker to close and a command for breaker closure is issued when the above three conditions are simultaneously satisfied. Speed matching can be caused by having the circuit produce a signal to raise generator speed when the slip is less than a given lower limit and by producing a signal to reduce generator speed if the slip exceeds a set upper limit.

8 Claims, 7 Drawing Figures

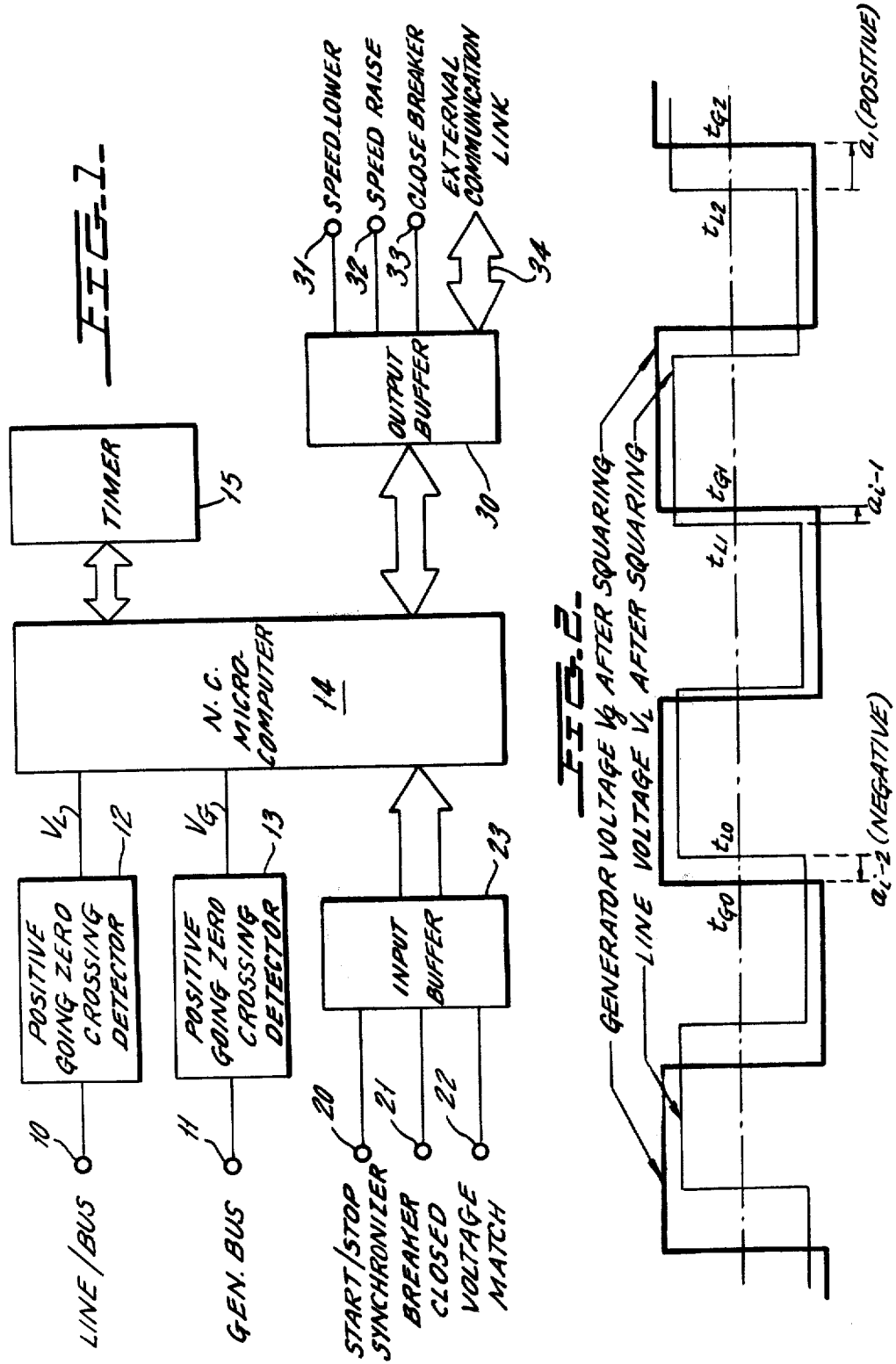

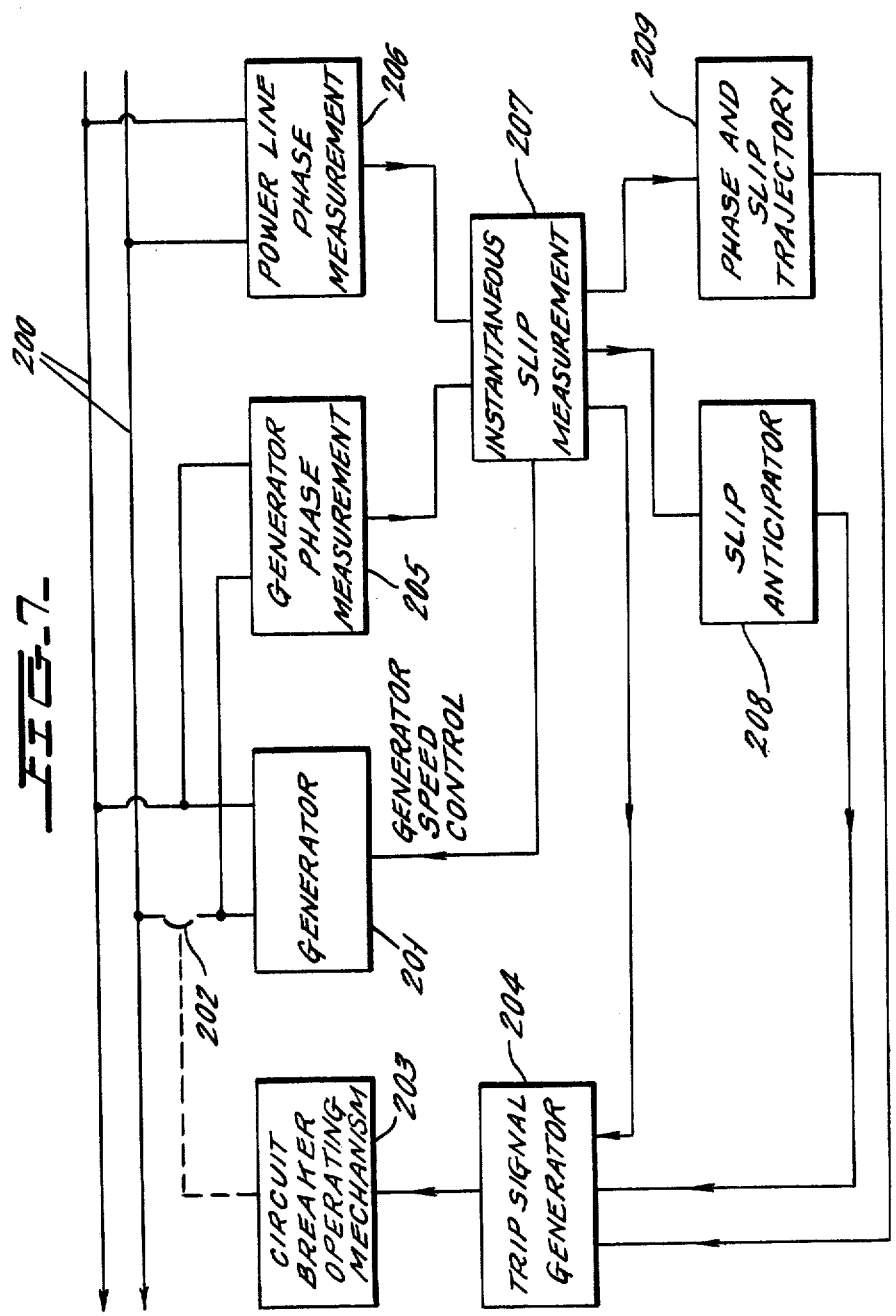

AUTOMATIC DEVICE FOR SYNCHRONIZATION OF PRIME MOVER WITH ELECTRICAL GRID

BACKGROUND OF THE INVENTION

This invention relates to synchronization circuits for synchronizing an electrical generator with an electrical power system such that the generator can be connected into the electrical system with the phases and frequencies of the generator and line matched as well as possible.

It is well known that if the phases and frequencies of a generator and a power line are not closely matched at the time a breaker closes to connect the generator to the electrical grid or line, very large transfers of energy may occur between the electrical grid and the generator. The resulting high electric current may damage the stator windings of the generator. Moreover, the accompanying transient torque on the generator shaft may reach values up to twenty times the design torque and could cause failure of the shaft. It is therefore necessary that the generator and line be synchronized before the generator is connected to the line and that the synchronizer be extremely accurate and fast.

The above problem is well recognized and is described, for example, in U.S. Pat. No. 3,801,796, patented Apr. 2, 1974 in the name of Charles E. Konrad. The synchronization scheme described in the above patent senses differences in frequency and phase of a power generator and the line to which it is to be connected and produces control signals for changing the speed of the power generator until the frequency and phase fall within defined tolerable limits. Thereafter, a control signal is produced to effect the connection of the power generator to the operating power line. This arrangement works very well but does not consistently assure a very small phase difference, preferably less than about 10 electrical degrees, between the line voltage and generator voltage at the instant the breaker closes to connect the generator to the power line.

Another prior art scheme which discloses the synchronization between a generator and a power system is that contained in U.S. Pat. No. 3,892,978, patented July 1, 1975 in the name of Paul H. Haley. That patent discloses a control system for synchronizing a gas turbine driven generator to an external power line and controls the fuel flow to the generator to obtain synchronization. The system determines the trajectory of turbine velocity and angular position so that synchronous speed and permissible phase angle difference required for synchronization are simultaneously obtained. The system of the aforementioned patent, however, will not ensure phase differences between line voltage and generator voltage at the instant of breaker closure which are very small and preferably less than about 10 electrical degrees.

BRIEF SUMMARY OF THE PRESENT INVENTION

In accordance with the present invention, a control system is provided wherein the phase difference between line voltage and generator voltage is exceptionally small and preferably less than about 10 electrical degrees. At the instant of closing, the frequency of the generator is close to and preferably slightly higher than that of the line frequency. The present invention takes into account the mechanical inertia of the circuit breaker used to electrically connect the power generator to the power line and recognizes the delay from the time between the command to close and the actual connection between the generator and line on the order of 0.1 second. Consequently, and in accordance with the present invention, the novel synchronizer circuit reliably anticipates the phase and slip between generator voltage and line voltage at a time in the future, related to the delay time in the closing of the circuit breaker from the time of the command to close until the contacts actually close and the generator is connected to the line. To this end, the phase of the power generator voltage and the phase of the power line voltage are very accurately measured so that as many of their derivatives as possible can be calculated with high accuracy. The circuit then produces signals related to the phase difference and the rate of change of phase difference between power line voltage and the generator voltage and the trends of phase and slip are extrapolated into the future by the amount of time which it takes the breaker to close. A command for breaker closure is then issued when the following three conditions are simultaneously satisfied:

(1) the instantaneous phase and slip are within allowable predetermined limits;

(2) the phase and slip expected at the instant of breaker closure are within given limits;

(3) the phase and slip at the instant of breaker closure are optimal for the given trajectory; that is, when phase and slip trajectories show that they will be the closest to their most desirable values during the given transition.

The novel circuit produces speed matching outputs whereby a signal is produced to raise or lower the generator speed when the slip is measured to be less than or greater than, respectively, given set lower and upper limits.

BRIEF DESCRIPTION OF THE DRAWINGS

FIG. 1 is a block diagram of the novel synchronizing circuit of the present invention.

FIG. 2 shows the measured generator voltage and measured line voltage after squaring as a function of time.

FIG. 7 is a block diagram of the system of the invention.

DETAILED DESCRIPTION OF THE DRAWINGS

Figure 3:
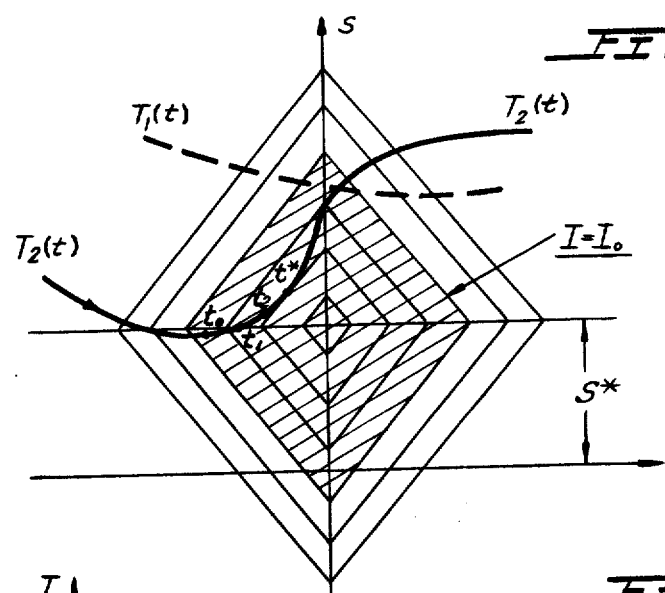
FIG. 3 shows a plot of a permissible area of closing in a phase plane of phase difference and slip with two particular trajectories related to phase and slip superimposed on the phase plane.

Referring first to FIG. 1, the synchronizing circuit of the invention schematically illustrated therein includes a terminal 10 which is connected to the power line bus and a terminal 11 which is connected to a generator box. The voltage applied to the power line bus terminal 10 is connected through a suitable positive going zero crossing detector circuit 12 which produces a squared output shown in FIG. 2 as "line voltage $V_L$ after squaring." Similarly, the generator bus terminal 11 is connected to a positive going zero crossing detector circuit 13 which produces a square wave output shown in FIG. 2 as "generator voltage $V_g$ after squaring."

These two signals, $V_g$ and $V_L$ which each contain information regarding the phase of the generator voltage and line voltage, are applied to an appropriate microcomputer 14 which may be an Intel microcomputer 8748. The microcomputer 14 will appropriately process the input signals $V_L$ and $V_g$ as will be described hereinafter. The microcomputer 14 is coupled to a timer circuit 15 which may be an Intel timer 8253. The circuit of FIG. 1 also contains three input terminals 20, 21 and 22 which respectively receive signals related to start/stop for the synchronizer circuit; a breaker closed signal; and a signal indicating a voltage match. These signal terminals are connected to an appropriate input buffer 23 which is in turn connected to the microcomputer 14 to provide data for the microcomputer dealing with the start or stop order, a breaker closed signal and a voltage match signal.

The microcomputer 14 is next coupled to an output buffer 30 which has three output terminals 31, 32 and 33. Output terminal 31 is an output terminal connected to the generator speed control circuit (not shown) and causes a decrease in the generator speed and thus a decrease in the generator frequency. Output terminal 32 produces an output signal when it is required to increase the speed of the generator in order to cause its frequency to increase to some preset synchronizing level. Output terminal 33 has a signal appearing thereon at the instant it is desired to initiate closing the circuit breaker since the synchronizing conditions which are required have been attained. The output buffer 30 is also provided with a suitable external communication link 34 as shown.

The operation of the circuit of FIG. 1 is as follows and can be obtained by appropriate programming of the microcomputer in a manner which will be obvious to any ordinarily skilled programmer:

The synchronizer is furnished with two periodic signals, the generator voltage $V_g(t)$ and the line voltage $V_L(t)$. The squaring circuits 12 and 13 operate to produce square wave signals which rise at the instant $t_{g0}$, $t_{g1}$, $t_{g2}$, ... $t_{gi}$ for the generator voltage and at instants $t_{L0}$, $t_{L1}$, $t_{L2}$, ... $t_{Li}$ for the line voltage. These are the instants at which the generator voltage $V_g$ and line voltage $V_L$ cross zero going from negative to positive. At these instants, interrupts are provided to the computer 14 and can, for example, cause it to read the state of a pulse counter which is driven by a high resolution crystal oscillator (not shown). The difference of the readings is proportional to the time:

$$a_i = t_{gi} - t_{Li} \tag{1}$$

The time $a_i$ is a measure of the phase difference between $V_L(t)$ and $V_g(t)$. Note that the rate of change of $a_i$ is a measure of slip.

The value of $a_i$ is calculated once per period, immediately after the interrupt from the voltage which is not leading. A voltage transition $V_L$ is defined as leading if the latest interrupt from $V_g$ precedes the interrupt from $V_L$ by more than half a cycle of the 60 Hz wave. For example, in FIG. 2, at time $t_{L2}$ the voltage $V_L$ is leading, and at time $t_{g0}$ the line voltage $V_L$ is not leading. Clearly between $t_{g0}$ and $t_{L2}$ the lead has changed. The calculation of the parameters of synchronization follows the computation of $a_i$ thus assuring no interrupts coming during the subsequent half cycle, that is, for more than 8 msec. in a 60 Hz system.

When the lead changes, the value of "a" changes sign, as seen in FIG. 2. For that to happen, there are two consecutive interrupts coming from the same source. The computer 14 is appropriately programmed to detect that event by counting passes through branches pertinent to a given interrupt. The lead will also change when the phase difference "$a_i$" exceeds one-half cycle. The computer 14 does the comparison and switches lead when appropriate.

To determine the current value of phase $A_i$, the algebraic average of the last four consecutive values of "a" is computed. Algebraic averaging is used since the errors in reading of "a" tend to compensate on subsequent cycles. In this way, the effect of noise with frequency higher than 30 Hz is reduced by at least 75%.

When the lead has changed due to the phase difference exceeding ½ cycle, the previous values of "a" are cancelled and a set of four new values must be accumulated before the new value of A is calculated. Therefore, the value of A is updated once a cycle until again the phase crosses 180°.

The slip ($S_i$) is calculated as a change of the average phase "A" averaged over four consecutive cycles. Thus:

$$S_i = (A_i - A_{i-4})/4 \tag{2}$$

By arithmetic averaging, all high frequency errors are cancelled or greatly reduced.

The rate of change of slip (D) is calculated in an analogous way, as a change of slip S averaged over four consecutive cycles. Thus:

$$D_i = (S_i - S_{i-4})/4 \tag{3}$$

Speed matching function is achieved by comparing the slip S with two predetermined limits, lower limit $D_L$ and upper limit $D_h$. If S is less than $D_L$, a command is issued at terminal 32 in FIG. 1 to raise the speed of the generator. Similarly, if S exceeds $D_h$ then a command is issued at terminal 31 in FIG. 1 to lower the generator speed. If S is between $D_L$ and $D_h$ then no command is issued at either of terminals 31 or 32.

In accordance with the invention and for the synchronization process, the values of phase and slip at the instant the breaker will close, i.e. when the electrical connection is made, rather than their instantaneous values, are included in the control process. Depending on the mechanical inertia of the breaker and on other factors, the circuit breaker closing time $\tau$ varies with breaker design. The expected values of phase and slip at the breaker closure instant: $A(\tau)$ and $S(\tau)$, respectively, can be calculated from the instantaneous values of phase and slip A and S with the help of Taylor's series expansion:

$$S(\tau) = S + D\tau \tag{4}$$

$$A(\tau) = A + S\tau + D\tau^2/2 \tag{5}$$

$A^*$ and $S^*$ denote the most desirable, optimal values of $A(\tau)$ and $S(\tau)$. Usually $S^*$ has a small positive value, on the order of 0.002 which assures that upon breaker closing the prime mover will deliver power into the line rather than being driven by the line. The value of $A^*$ is usually zero. A measure of "goodness" of synchronizing process is how "close" the parameters A and S are to the optimal pair A* and S*. An index of optimization I (A,S) is defined as:

$$I(A,S) = |A - A^*| + K|S - S^*| \tag{6}$$

where the constant "K" weights the relative importance of A and S. The smaller the value of I at breaker closure time I ($\tau$), the better the synchronization between the generator and the line.

During synchronization the values of A and S vary with time; they can be considered state variables and follow a trajectory in a phase plane as shown in FIG. 3. Two trajectories, $T_1(t)$ and $T_2(t)$ are shown in FIG. 3. The lines of constant I in the phase plane (A,S) have the shape of a diamond.

Assume that the trajectory $T_2(t)$ in FIG. 3 is followed and that the synchronizer issues a "permission-to-close-breaker" signal at terminal 33 in FIG. 1 when the value of I (t) falls below a given value $I_o$, e.g. within the shaded area in FIG. 3. The breaker would thus be commanded to close at the time when the trajectory reached point $t_o$ and the actual closing, after $\tau$, would be accomplished at $t_1$ where $t_1 = t_0 + \tau$.

It is clear from FIG. 3 that it would have been better if the synchronizer held back the command until time $t_2$ which is $\tau$ before t* when the index I reaches the minimum on the whole trajectory $T_2(t)$. The time $t_2$ is the best time to command the breaker to close since t* is the best time for the electrical connection to be made.

Figure 4:
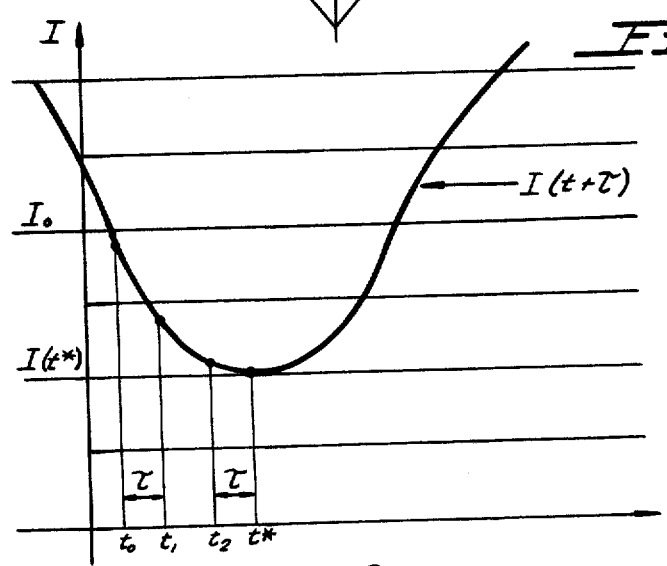
FIG. 4 illustrates an index of optimization 1 as a function of time in connection with the plot shown in FIG. 3.

The determination of the best time $t_2$ to initiate the breaker-close command can be understood from FIG. 4. In order to find the time $t_2$, the computer is programmed to calculate I ($t+\tau$) which is the expected value of the index I (t) in the future by $\tau$ seconds. As long as I ($t+\tau$) is progressively decreasing (from $t_o$ to t* in FIG. 4) no command to close the breaker is issued. As soon as I ($t+\tau$) begins increasing, the breaker is ordered to close and the actual closing is effected $\tau$ seconds later, presumably at time t* when I (t) reaches a local minimum. The function I ($t+\tau$) reaching a minimum at $t = t_2$ is not enough for synchronization to be permitted. The value of the index at the instant of closing, I (t*), must also be small enough and less than a given constant $B_2$.

Since A (t*) and S (t*) are calculated by means of several differentiations, as in Equation (4) and Equation (5), they are subject to error. To assure that such error does not result in the breaker closing out of phase, the value of I at the time $t_2$ must also be small enough and less than a given constant $B_1$. Moreover, to guard against errors resulting from deformation of a single cycle of a voltage sinusoid it is also required that the value of I at one cycle before $t_2$ be less than $B_1$. Therefore, for issuing at time $t_2$ a command to close the breaker, the following four conditions must be fulfilled simultaneously:

(1) $I(t_2) \leq B_1$
(2) $I(t_2 - \Delta t) \leq B_1$
where $\Delta t \approx 17$ ms is a period of 60 Hz wave.
(3) $I(t_2 + \tau) \leq B_2$ $$\left. \frac{dI(t+\tau)}{dt} \right|_{t=t_2} = 0 \tag{4}$$

Figure 5:
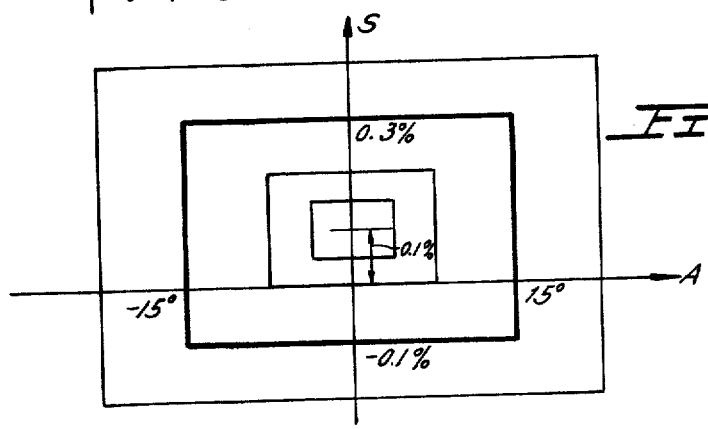
FIG. 5 schematically illustrates lines of constant 1 (optimization) for particular synchronization requirements.

It is not necessary that the index I be formulated by Equation (6). In a conventional representation the lines of constant I form a rectangle as shown in FIG. 5 and the expression for I is:

$$I(A,S) = \text{Max}(|S - S^*|, K|A - A^*|)$$

A common requirement for synchronization is that the phase A be within ($-15°$) and $+15°$ and slip S within ($-0.1\%$) and $+0.3\%$. In such a case:

$S^* = 0.001$, $A^* = 0$, $K = 2.88$.

These lines of constant I are shown in FIG. 5. The thick line surrounds the permitted area.

Figure 6:
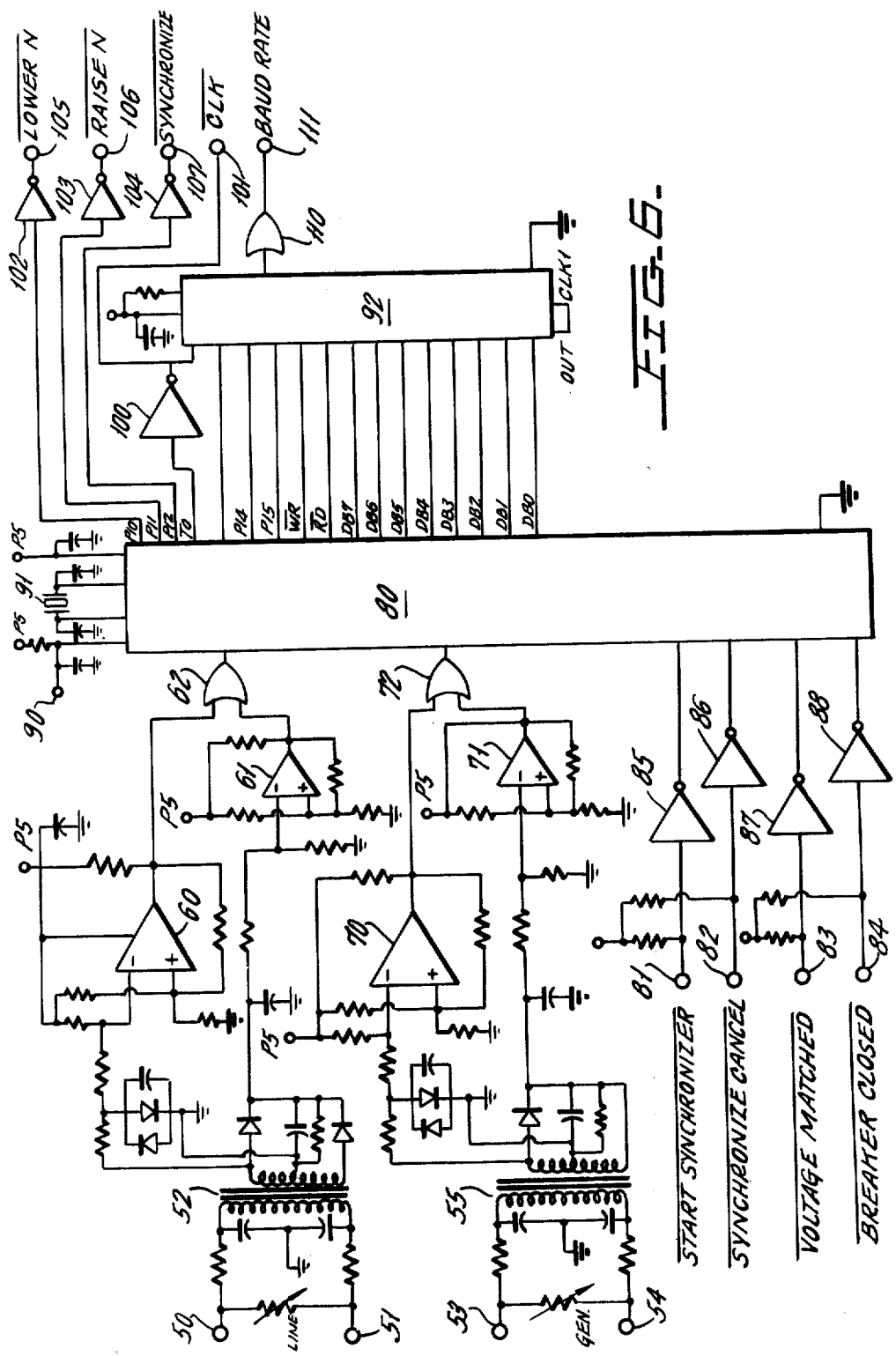
FIG. 6 is a detailed circuit diagram of a synchronization circuit which can be used with the present invention.

Referring next to FIG. 6, there is shown therein a detailed circuit diagram of the novel synchronizer and speed matcher circuit of the present invention. The arrangement of FIG. 6 has been used for the synchronization of a gas turbine driven power generator with a power line operable at 60 Hz. The power line is connected between two terminals 50 and 51 to a signal transformer 52 connected as shown. In a similar manner, the generator voltage output is connected between two terminals 53 and 54 to a transformer 55, where the pickup circuits for the voltage and generator voltage are identical.

One terminal of the center-topped secondary winding of transformer 52 is connected to an input terminal of amplifier 60 while the other terminal of the secondary winding is connected to the input of an amplifier 61. Note that amplifiers 60 and 61 may be each ¼ of an integrated circuit type LM339. The other input terminal of each of amplifiers 60 and 61 are connected to ground while their outputs are connected to the OR gate 62.

The circuit described above will produce the line voltage $V_L$ after squaring as shown in FIG. 2. An identical circuit is provided for producing the generator voltage $V_g$ after squaring and is connected to the secondary winding of transformer 55. The circuit includes amplifier sections 70 and 71 which are each ¼ of the integrated circuit LM339 in common with amplifer sections 60 and 61. The outputs of amplifier sections 70 and 71 are connected to the OR gate 72. Note that OR gates 62 and 72 are each ¼ of the circuit on an integrated circuit type 74LS32.

The outputs of the OR gates 62 and 72 are then connected to microcomputer 80 which is a type of 8748 microcomputer manufactured by Intel Corporation.

Also connected to the microcomputer 80 are terminals 81 through 84 which receive signals related to the starting of the synchronizing circuit, a synchronization cancel signal, a voltage matched signal and a breaker closed signal. These signals are all applied through inverters 85 to 88, respectively, and are connected to the microcomputer 80.

Next connected to the microcomputer 80 is a power supply terminal P5 and a reset terminal 90. A 6 MHz crystal 91 is applied to microcomputer 80 as shown.

A timer 92 for the microcomputer 80 consists of an integrated circuit timer manufactured by Intel Corporation, type 8253. The timer 92 is connected to the microcomputer 80 as illustrated.

A clock terminal output of the timer 92 is connected to the inverter 100, the microcomputer 80 and output terminal 101. Terminals $P_{10}$, $P_{11}$, $P_{12}$ and $T_0$ of microcomputer 80 are respectively connected through inverters 102, 103 and 104 with their outputs respctively connected to terminals 105, 106 and 107, respectively, related to lowering generator speed, raising generator speed and a signal indicating synchronization, respectively.

A further output of timer 92 is connected to OR gate 110 which may also be ¼ of the same integrated circuit containing OR gates 62 and 72. The output of OR gate 110 is connected to a baud rate output terminal 111. Other chips including, for example, interface chips, memory chips and the like can also be connected to the microcomputer 80 in any desired manner as determined by the programmer and circuit designer. The microcomputer 80 and timer 92 will then be programmed to permit the calculations described previously. Those skilled in the art can appreciate that various programs can be used to perform the calculations described.

The foregoing shows the system of the invention implemented with microprocessor technology. Clearly, however, any measurement and signal processing circuits could be used as demonstrated in FIG. 7. Thus, in FIG. 7, there is illustrated a single phase power line 200 which is energized by other prime movers, not shown, and a generator 201 is to be connected to the line 200. Note that a multiphase circuit could also have been shown. Generator 201 is connected to line 200 by closing the conventional circuit breaker 202. Circuit breaker 202 is controlled by a conventional operating mechanism 203 which in turn is released to closed breaker 202 by a trip signal from circuit 204. There will be the time delay τ from the instant the trip signal is produced until the contacts are closed.

Phase measuring circuits 205 and 206 are connected to generator 201 and line 200, respectively, and these produce output signals to the slip measuring means such as a circuit 207. The slip measuring circuit 207 can be an analog circuit and produce output signals to generator 201 to increase or decrease its speed until the measured slip is within given limits.

Slip measuring circuit 207 is also connected to circuit 208 which produces a signal related to anticipated slip at some time τ in the future, depending on the rate of change of the instantaneous slip. Circuit 207 is also connected to phase and slip trajectory measuring circuits 209 which determine their trajectory and produce an output when their trajectory is optimum. Note that circuits 207, 208 and 209 can be analog or their functions can be carried out by a microcomputer, as in FIGS. 1 and 6.

Circuits 207, 208 and 209 then control the trip signal generator 204 such that a trip signal cannot be applied to mechanism 203 unless their outputs are within predetermined bounds.

From the foregoing description, those skilled in the art can appreciate that a novel control circuit is described for synchronizing a prime mover or electrical generator to an electrical grid or line such that connection between the prime mover and the grid occurs when the following three conditions are simultaneously satisfied:

(1) the instantaneous phase and slip are within allowable predetermined limits;
(2) the phase and slip expected at the instant of breaker closure are within given limits and
(3) the phase and slip at the instant of breaker closure are optimal for the given trajectory, that is, when phase and slip trajectories show that they will be the closest to their most desirable values during the given transition.

Although the present invention has been described in connection with a preferred embodiment thereof, many variations and modifications will now become apparent to those skilled in the art. It is preferred, therefore, that the present invention be limited not by the specific disclosure herein, but only by the appended claims.

What is claimed is:

1. An automatic device for ensuring synchronization between the output voltage and an electrical generator and the voltage of a line to which the generator is to be connected at the instant of closure of a circuit breaker which connects said electrical generator to said power line; said circuit breaker having an energizable closing circuit which causes the closing of the circuit breaker contacts after some delay time; said automatic device comprising:

first phase sensor means for sensing the instantaneous phase of the voltage of said generator;

second phase sensor means for sensing the instantaneous phase of the voltage of said power line;

slip determining means connected to said first and second phase sensor means for developing signals related to the slip between the instantaneous phases of said power line and said generator output voltages;

trajectory determining means for determining the trajectory of slip and phase to anticipate the expected slip and phase at times in the future;

signal output means responsive to said first and second phase sensor means, said slip determining means and said trajectory determining means for delivering a signal to said circuit breaker energizable closing circuit to initiate closing of said circuit breaker upon the simultaneous occurrence of the following three conditions: (1) at an instant the instantaneous phase and slip are within given limits, (2) the phase and slip expected at the instant of breaker closure are with given limits and (3) when the phase and slip are optimal for their particular trajectory.

2. The device of claim 1 which further includes generator speed control means; said slip determining means connected to said generator speed control means to respectively increase or decrease generator speed to change the slip and to bring the slip into a predetermined range of values.

3. The device of claim 1 wherein said first and second phase sensor means include identical respective positive going zero crossing detectors.

4. The device of claim 2 wherein said first and second phase sensor means include identical respective positive going zero crossing detectors.

5. The device of claim 1 which further includes generator speed control means; said slip determining means connected to said generator speed control means to respectively increase or decrease the generator speed to change the slip and to bring the slip into a predetermined range of values.

6. The device of claim 5 wherein said first and second phase sensor means include identical respective positive going zero crossing detectors.

7. The device of claim 1 which further includes microcomputer means for determining the slip between the phases of said generator and power line and for determining said trajectory of slip and phase.

8. The process of connecting a power generator to an energized electric line when the two are synchronized in phase to within less than about 10 electrical degrees comprising, in combination;

measuring the instantaneous phase of the output voltage of said generator;

measuring the instantaneous phase of the voltage of said electric line;

determining the slip between said generator and electric line;

determining the trajectory of the instantaneous phase and slip;

and producing a signal to initiate closing a circuit breaker to connect said generating to said line when;

(a) the instantaneous phase and slip are within given limits;

(b) the phase and slip which are expected at the instant the circuit breaker contacts close at some given delay time following said signal to close said circuit breaker are within given limits; and (c) the phase and slip are optimal for a given trajectory during a given transition.

* * * * *